(12) United States Patent
Yoshida

(10) Patent No.: US 11,808,410 B2
(45) Date of Patent: Nov. 7, 2023

(54) HYDROGEN FILLING APPARATUS

(71) Applicant: TATSUNO CORPORATION, Tokyo (JP)

(72) Inventor: Yuichi Yoshida, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 0 days.

(21) Appl. No.: 17/338,398

(22) Filed: Jun. 3, 2021

(65) Prior Publication Data

US 2021/0388947 A1   Dec. 16, 2021

(30) Foreign Application Priority Data

Jun. 10, 2020   (JP) ................................ 2020-100726

(51) Int. Cl.
*F17C 5/06* (2006.01)
*F17C 13/02* (2006.01)

(52) U.S. Cl.
CPC .............. *F17C 5/06* (2013.01); *F17C 13/025* (2013.01); *F17C 2221/012* (2013.01); *F17C 2250/03* (2013.01); *F17C 2250/0626* (2013.01); *F17C 2260/025* (2013.01); *F17C 2270/0171* (2013.01)

(58) Field of Classification Search
CPC ... F17C 5/06; F17C 2221/012; F17C 2250/03
See application file for complete search history.

(56) References Cited

U.S. PATENT DOCUMENTS

| 7,325,561 B2 | 2/2008 | Mathison et al. |
| 2007/0000016 A1 | 1/2007 | Handa |
| 2017/0146194 A1 | 5/2017 | Youlio et al. |
| 2017/0241592 A1 | 8/2017 | Whiteman et al. |

FOREIGN PATENT DOCUMENTS

| JP | 2018038328 A | 3/2018 |
| WO | 9301889 A1 | 2/1993 |

OTHER PUBLICATIONS

Extended European Search Report for EP 18 91 3901; dated Sep. 17, 2021.

*Primary Examiner* — Paul J Gray
(74) *Attorney, Agent, or Firm* — Stetina Brunda Garred and Brucker

(57) ABSTRACT

A hydrogen filling apparatus that can quickly fill vehicles equipped with multiple large-capacity fuel tanks with hydrogen gas while complying with filling protocol. The hydrogen filling apparatus (100) of the present invention includes: a plurality of filling systems; a filling control device (10, 20) for each of the filling systems; a filling pipe communicating with a rear facility in each of the filling systems; a set of filling members (for example, flow control valves, flow meters) interposed in each of the filling pipes and connected to each of the filling control devices; and a filling hose connected to each of the filling pipes, each filling hose having a filling nozzle at a tip; wherein one of the plurality of filling control devices has a function of selectively exerting a first control mode that controls only the filling system including the filling control device and a second control mode shared as a control device for the plurality of filling systems, and a switching means for switching between the first control mode and the second control mode in the one of the filling control devices is provided.

8 Claims, 4 Drawing Sheets

[Fig. 1]
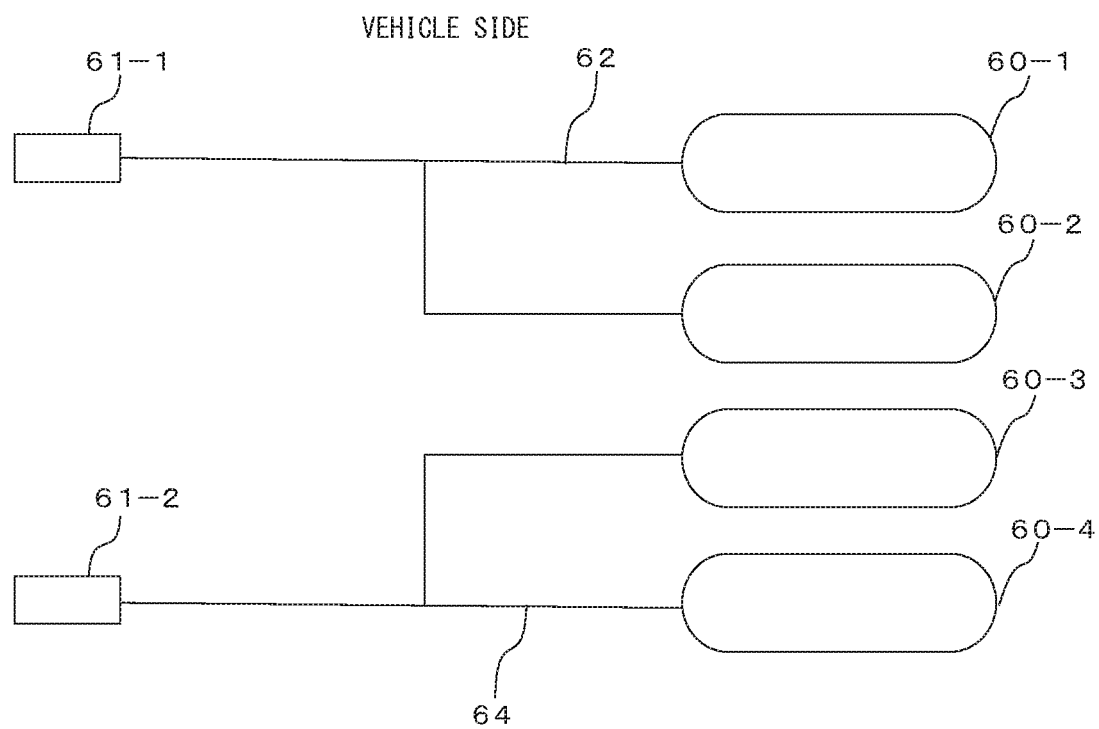
[Fig. 2]
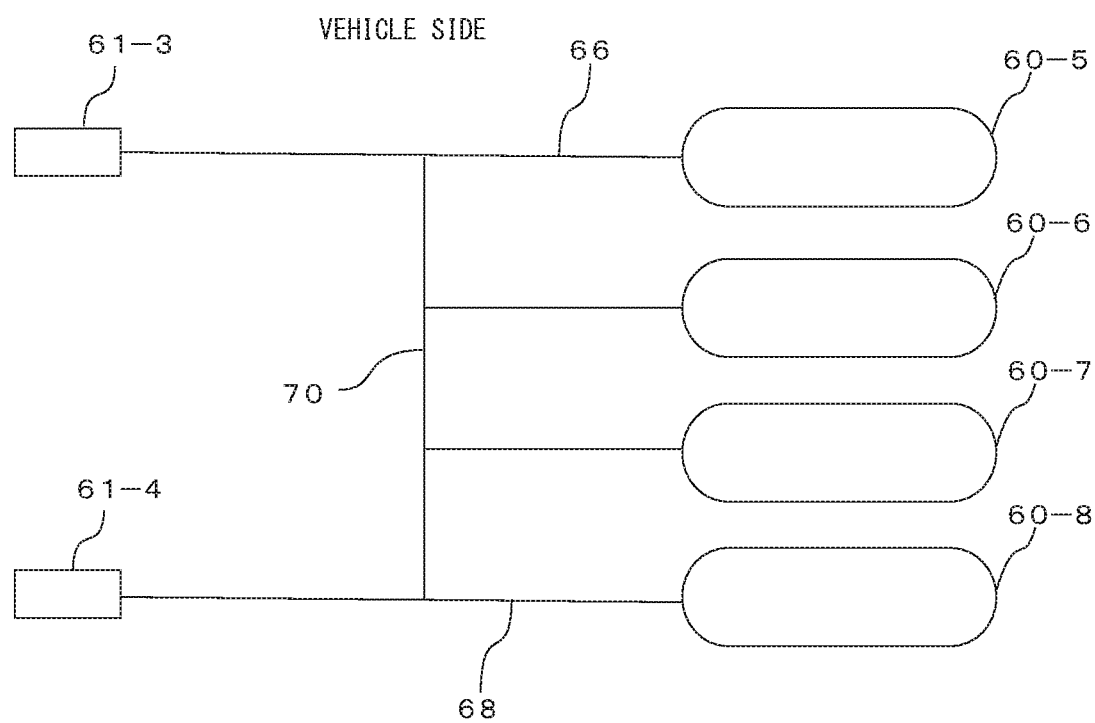

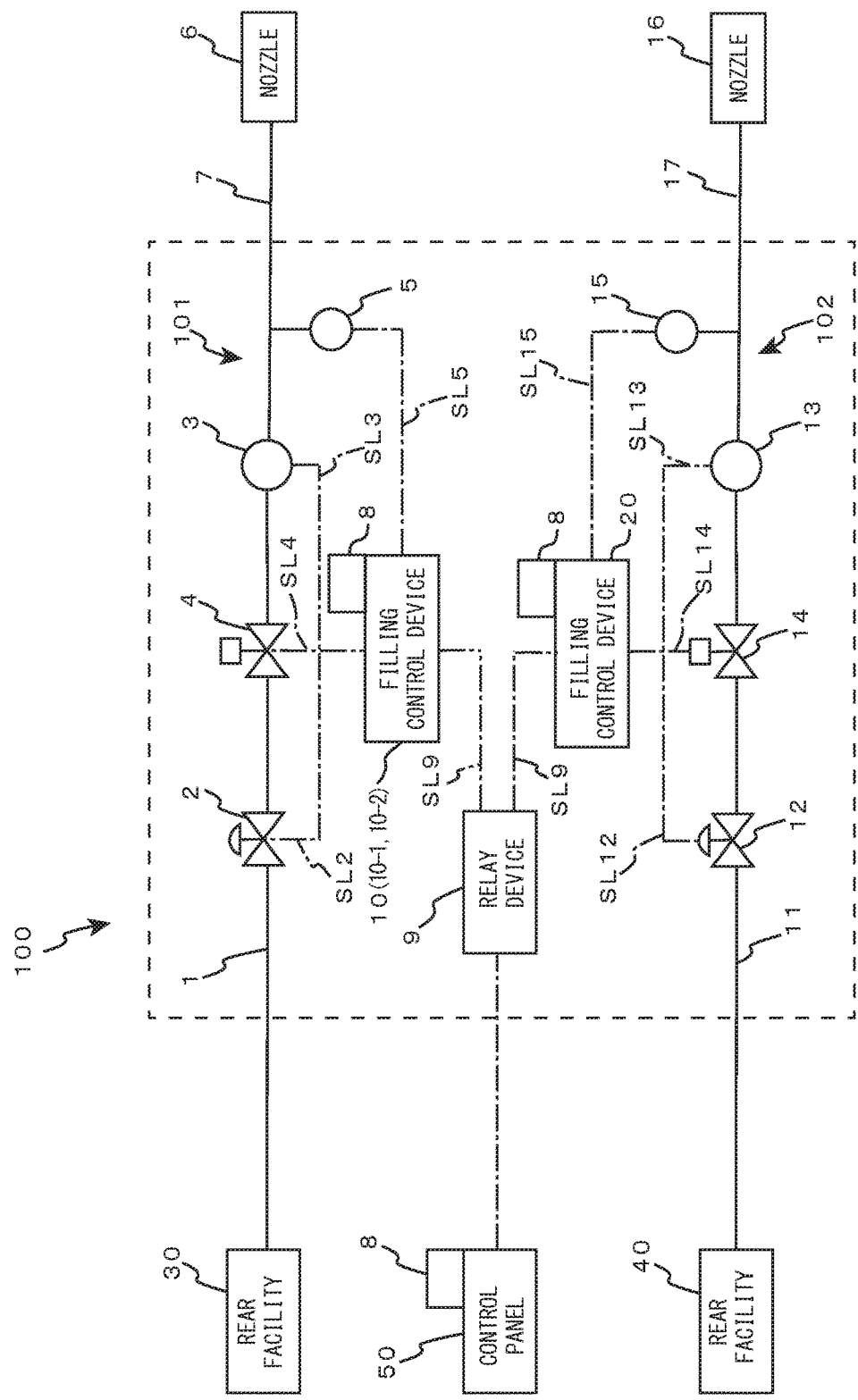
[Fig. 3]

[Fig. 4]
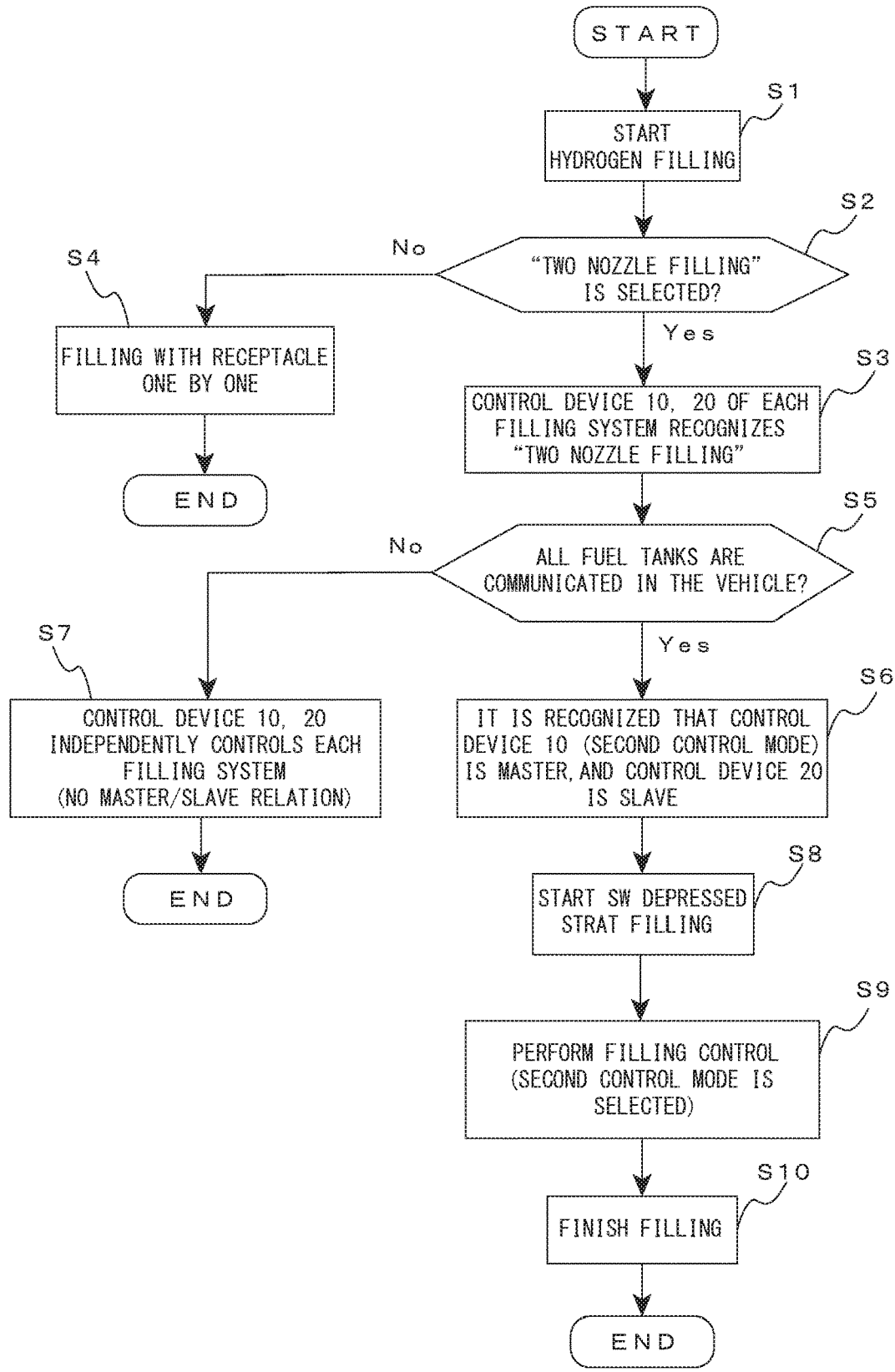

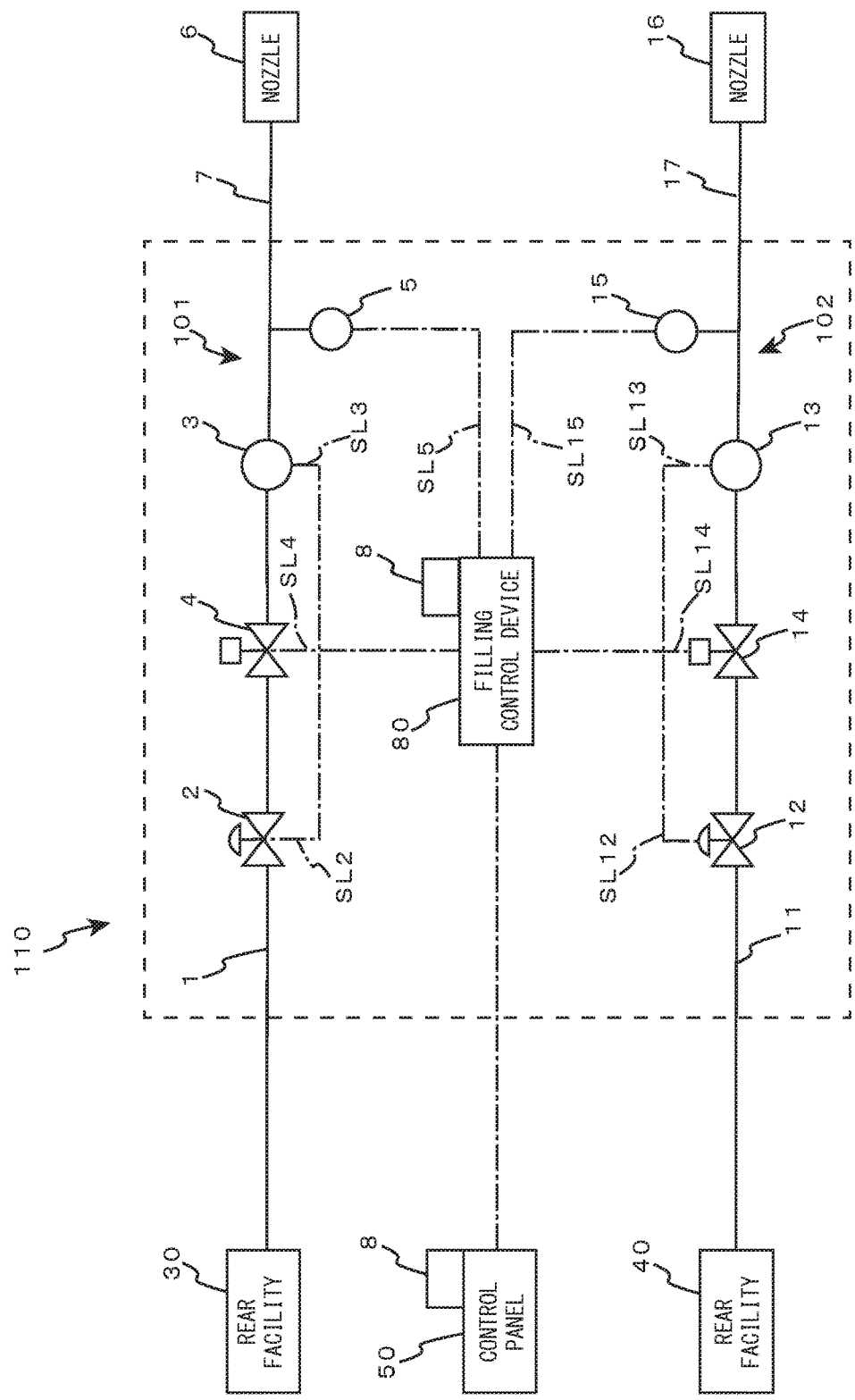
[Fig. 5]

HYDROGEN FILLING APPARATUS

CROSS-REFERENCE TO RELATED APPLICATIONS

The present application claims priority to Japanese Patent Application No. 2020-100726 filed on Jun. 10, 2020 and Japanese Patent Application No. 2021-43099 filed on Mar. 17, 2021, the disclosures of which are incorporated herein by reference.

STATEMENT RE: FEDERALLY SPONSORED RESEARCH/DEVELOPMENT

Not Applicable

BACKGROUND

1. Field of the Invention

The present invention relates to a hydrogen filling apparatus for, for example, filling a fuel tank of a fuel cell vehicle with hydrogen gas as fuel.

2. Description of the Related Art

Vehicles that use hydrogen gas as fuel (fuel cell vehicles) have become widespread in connection with growing awareness of environmental issues in recent years. As such vehicles, not only passenger cars but also large trucks and buses used for logistics have been developed. The present applicant has proposed an apparatus for stably and efficiently filling such vehicles with hydrogen gas (see Japanese Patent Publication No. 2016-169869 gazette). Here, large trucks and buses are equipped with a plurality of large-capacity fuel tanks in consideration of traveling a long distance.

However, when supplying hydrogen to a large truck equipped with multiple large-capacity fuel tanks with a single filling nozzle, filling time may become very long depending on the diameter of a filling pipe in a hydrogen filling apparatus, the amount of hydrogen in a rear equipment, and the capacity of a compressor. On the other hand, even when filling large trucks and buses with hydrogen gas, it is necessary to comply with filling protocol.

The content of Japanese Patent Publication No. 2016-169869 gazette is incorporated herein by reference in its entirety.

BRIEF SUMMARY

The present invention has been proposed in view of the above-mentioned problems of the prior art, and the object thereof is to provide a hydrogen filling apparatus that can quickly fill vehicles (for example, large trucks and buses) equipped with multiple large-capacity fuel tanks with hydrogen gas while complying with filling protocol.

A hydrogen filling apparatus (100) of the present invention is characterized by including: a plurality of filling systems (101, 102); a filling control device (10, 20) for each of the filling systems (101, 102); a filling pipe (1, 11) communicating with a rear facility (30, 40) in each of the filling systems (101, 102); a set of filling members (for example, flow control valves 2, 12, flowmeters 3, 13) interposed in each of the filling pipes (1, 11) and connected to each of the filling control devices (10, 20); and a filling hose (7, 17) connected to each of the filling pipes (1, 11), each filling hose having a filling nozzle (6, 16) at a tip; wherein one of the plurality of filling control devices (10, 20) has a function of selectively exerting a first control mode that controls only the filling system including the filling control device (the filling control device for which the first control mode is selected is indicated by a reference numeral 10-1) and a second control mode shared as a control device for the filling systems (the filling control device for which the second control mode is selected is indicated by a reference numeral 10-2), and a switching means (8) for switching between the first control mode and the second control mode in the one of the filling control devices (10, 20) is provided.

In the present invention, it is preferable that the filling control device (10) having a function of selectively exerting a first control mode and a second control mode has a function of adjusting the filling member (for example flow control valve 12, flowmeter 13) in each of the filling systems (102) equipped with other filling control devices (20) via a relay device (9: Relay Programmable Logic Controller (PLC), for instance) in the second control mode (the state indicated by the reference numeral 10-2).

In addition, in the present invention, it is preferable that the filling member has a function of adding up and displaying a filling amount in each of the filling systems (101, 102) in the second control mode (the state indicated by the reference numeral 10-2).

Further, in the present invention, it is preferable that the filling control device (10) has a function of ending filling in the filling systems (101, 102) when a highest pressure measured in the filling systems reaches a filling end pressure in the second control mode (the state indicated by the reference numeral 10-2).

Still further, a hydrogen filling apparatus (110) of the present invention is characterized by including: a plurality of filling systems (101, 102); a single filling control device (80) for controlling the filling systems; a filling pipe (1, 11) communicating with a rear facility (30, 40) in each of the filling systems; a set of filling members (for example, flow control valves 2, 12, flowmeters 3, 13) interposed in each of the filling pipes and connected to the filling control device (80); and a filling hose (7, 17) connected to each of the filling pipes, each filling hose having a filling nozzle (6, 16) at a tip; wherein the filling control device (80) has a function of selectively exerting a first control mode that individually controls each of the filling systems (101,102) and a second control mode that comprehensively controls the filling systems (101,102).

It is preferable that in this hydrogen filling apparatus (110) also, the filling member has a function of adding up and displaying a filling amount in each of the filling systems (101,102) in the second control mode.

Further, it is preferable that the filling control device (80) has a function of ending filling in the filling systems when a highest pressure measured in the filling systems (101,102) reaches a filling end pressure in the second control mode.

Vehicles (large trucks, buses) equipped with a plurality of large-capacity fuel tanks (60) are provided with a plurality of (for example, two) receptacles (61) for hydrogen filling. According to the present invention having the above configuration, attaching each of the filling nozzles (6, 16) in the plurality of (for example, two) filling systems (101, 102) to each of the plurality of receptacles (61) of a large truck or a bus to fill can save a lot of time compared to a case where one of the filling nozzles (6, 16) is attached to each of the plurality of receptacles (61) one after another to fill with hydrogen.

Here, in vehicles equipped with a large-capacity plurality of fuel tanks (60), there are vehicle types in which the plurality of fuel tanks (60) are independent of each other (fuel tanks are not communicating with each other and are separated), and vehicle types in which the plurality of fuel tanks (60) communicate with each other in the vehicle. In a plurality of fuel tanks (60) that are independent of each other, the route from one receptacle (61) to the fuel tank (60) is separated (independent) from the other route, so that when a filling nozzle (6, 16) is attached to each of the plurality of receptacles (61) to fill hydrogen, each of the filling control device (10, 20) may perform filling control according to a filling protocol to be observed only for each of the filling system (101, 102) to which the filling nozzle (6, 16) mounted on each of the receptacles (61) is connected. On the other hand, in the fuel tanks (60) that communicate with each other in the vehicle, even if each of the filling control devices (10, 20) controls only for each of the filling systems (101, 102) to which the filling nozzle (6, 16) mounted on each of the receptacles (61) is connected, a pressure on the fuel tank (60) side communicating with the other receptacle (61) affects, so that it is difficult to accurately grasp a hydrogen filling amount and whether or not a filling protocol is observed.

On the other hand, in the present invention, one of the plurality of filling control devices (10, 20) has a function of selectively exerting the first control mode (the filling control device 10 for which the first control mode is selected is indicated by the reference numeral 10-1) and the second control mode (the filling control device 10 for which the second control mode is selected is indicated by the reference numeral 10-2), so that in the fuel tanks (60) communicating with each other in the vehicle, the filling control device (10) selects the second control mode (10-2) and is shared as a control device for the plurality of (for example, two) filling systems (101, 102). Then, in the mode in which the second control mode (10-2) is selected, the filling members (flow control valve 12, flowmeter 13) in the filling system (102) provided with other filling control devices (20) are controlled via a relay device (9: Relay Programmable Logic Controller (PLC), for instance), and data on the fuel tanks (60) communicating with the filling systems (102) where other filling control devices (20) are installed is acquired, and based on the data, hydrogen filling can be performed according to a filling protocol to be observed. In other words, according to the present invention, whether the plurality of fuel tanks (60) are independent of each other or communicate with each other in a vehicle, hydrogen filling can be performed quickly according to a filling protocol to be observed.

Further, with the present invention, controlling the plurality of (for example, two) filling systems (101, 102) with the single filling control device (80) allows hydrogen filling to be performed quickly according to a filling protocol to be observed whether the plurality of fuel tanks (60) are independent of each other or communicate with each other in a vehicle.

BRIEF DESCRIPTION OF THE DRAWINGS

FIG. 1 is an explanatory view showing arrangement of fuel tanks of a vehicle, and receptacles for hydrogen filling in the vehicle with multiple routes, which are independent of each other, connecting the fuel tanks and the hydrogen filling receptacles.

FIG. 2 is an explanatory view showing arrangement of fuel tanks of a vehicle, and receptacles for hydrogen filling in the vehicle with multiple routes, which communicate with each other in the vehicle, connecting the fuel tanks and the hydrogen filling receptacles.

FIG. 3 is a block diagram of a hydrogen filling apparatus according to the first embodiment of the present invention.

FIG. 4 is a flow chart showing control in the first embodiment.

FIG. 5 is a block diagram of a hydrogen filling apparatus according to the second embodiment of the present invention.

DETAILED DESCRIPTION

Hereinafter, an embodiment of the present invention will be described with reference to the accompanying drawings. In the below explanation, a vehicle (for example, a large truck or a bus) equipped with a plurality of large-capacity fuel tanks 60 will be exemplified with reference to FIGS. 1 and 2. The vehicle shown in FIG. 1 is a vehicle equipped with a plurality of fuel tanks 60 (four tanks in FIGS. 1 and 2), and is provided with a plurality of (two ports in FIGS. 1 and 2) hydrogen filling receptacles 61-1 and 61-2, a route 62 communicating the hydrogen filling receptacles 61-1 and the fuel tanks 60-1 and 60-2, a route 64 communicating the hydrogen filling receptacle 61-2 and the fuel tanks 60-3 and 60-4, and the route 62 and the route 64 are independent and do not communicate with each other. In other words, the fuel tanks 60-1 and 60-2 of the route 62 do not communicate with the fuel tanks 60-3 and 60-4 of the route 64 and are separated from each other.

When filling the vehicle shown in FIG. 1 with hydrogen, each of the two receptacles 61-1 and 61-2 is equipped with each of two filling nozzles in a filling device (not shown) to fill with hydrogen. Here, the hydrogen filling apparatus (not shown in FIGS. 1 and 2) is provided with two filling systems to which the filling nozzles are connected (a first filling system 101 and a second filling system 102 in FIG. 3), so that two filling nozzles can be attached to the two receptacles 61-1 and 61-2. Then, in the vehicle of FIG. 1, the route 62 and the route 64 are independent, so that the control device provided in each filling system of the hydrogen filling apparatus may perform filling control according to a filling protocol to be observed for the filling system in which the control device is provided.

On the other hand, in the vehicle shown in FIG. 2 also, a plurality of fuel tanks 60-5 to 60-8 are provided (four tanks in FIGS. 1 and 2), via a route 70 in the vehicle are communicated a route 66 that connects the hydrogen filling receptacle 61-3 and the fuel tanks 60-5 and 60-6, and a route 68 that connects the hydrogen filling receptacle 61-4 and the fuel tanks 60-7 and 60-8. Therefore, the four fuel tanks 60-5 to 60-8 also communicate with each other in the vehicle. In the vehicle shown in FIG. 2, when two filling nozzles of the hydrogen filling apparatus are attached to the receptacles 61-3 and 61-4 for hydrogen filling, since the route 66 and the route 68 communicate with each other, in a hydrogen filling apparatus, for example, even if the filling system connected to the route 66 is controlled, the pressures and the like in the fuel tanks 60-5 and 60-6 are affected by the pressures and the like in the fuel tanks 60-7 and 60-8 in the route 68. Therefore, in the vehicle of FIG. 2, it is difficult to confirm whether or not the hydrogen filling control according to the filling protocol can be executed even if the hydrogen filling apparatus controls only the filling system communicating with the receptacle.

On the other hand, in the illustrated embodiment, even in the vehicle of FIG. 2 having a plurality of (two-port)

receptacles in which the route 66 and the route 68 communicate with each other, when hydrogen filling is performed by attaching a filling nozzle to each of the two receptacles, the filling control device in one of the two filling systems controls a filling member (for example, a flow control valve, a flow meter) in the other filling system via a relay device (for example, PLC), so that rapid hydrogen filling can be performed according to the filling protocol to be observed in the two hydrogen filling systems. Details of the hydrogen filling will be described with reference to FIGS. 3 and 4.

In FIG. 3, the hydrogen filling apparatus according to the illustrated embodiment is indicated by a reference numeral 100 as a whole, and has two filling systems, the first filling system 101 and the second filling system 102, and the first and second filling systems 101 and 102 are provided with filling control devices 10 and 20 (control devices), respectively. The first filling system 101 includes a filling pipe 1, and an upstream side (left side in FIG. 3) of the filling pipe 1 communicates with a rear facility 30 (a hydrogen gas supply source and its ancillary equipment), and a downstream side (right side in FIG. 3) of the filling pipe 1 communicates with a filling nozzle 6 via a filling hose 7. A flow rate adjusting valve 2, a flow meter 3 and a shutoff valve 4 are interposed in the filling pipe 1, and the flow rate adjusting valve 2, the flow meter 3 and the shutoff valve 4 are connected to the filling control device 10 via signal lines SL2, SL3 and SL4, respectively. Here, the flow rate adjusting valve 2, the flow meter 3 and the shutoff valve 4 are filling members necessary for filling. Further, a pressure gauge 5 is interposed in the filling pipe 1, and the pressure gauge 5 is connected to the control device 10 via a signal line SL5.

Hydrogen gas stored in the rear facility 30 (hydrogen gas supply source) passes through the filling hose 7 in the filling pipe 1 via the flow rate adjusting valve 2, the shutoff valve 4 and the flow meter 3, and is supplied to a tank 60 (shown in FIGS. 1 and 2) (not shown in FIG. 3) via the filling nozzle 6. The filling control device 10 acquires measurement result of the flow meter 3 via the signal line SL3, and transmits a flow rate control signal to the flow rate adjusting valve 2 via the signal line SL2. Further, when filling is completed or stopped, the filling control device 10 transmits control signals to the flow rate adjusting valve 2 and the shutoff valve 4 via the signal lines SL2 and SL4, respectively, and the flow rate adjusting valve 2 and the shutoff valve 4 are closed. Then, a filling pressure in the filling pipe 1 is measured with the pressure gauge 5, and measurement result of the pressure gauge 5 is inputted to the control device 10 via the signal line SL5. The filling control device 10 has a function of exchanging information and control signals with the flow rate adjusting valve 2, the flow meter 3, the shutoff valve 4 and the pressure gauge 5 of the first filling system 101, and after acquiring data of the tank on the vehicle side (pressure in the tank, temperature, filling amount, etc.), hydrogen gas is supplied to the tank on the vehicle side within an appropriate pressure range according to pressure difference from the tank on the vehicle side to perform hydrogen filling according to the filling protocol to be observed.

On the other hand, the second filling system 102 includes a filling pipe 11, and an upstream side of the filling pipe 11 communicates with a rear facility 40, and a downstream side of the filling pipe 11 is connected to a filling nozzle 16 via a filling hose 17. A flow rate adjusting valve 12, a flow meter 13 and a shutoff valve 14 are interposed in the filling pipe 11, and are connected to the filling control device 20 via signal lines SL12, SL13 and SL14, respectively. Further, a pressure gauge 15 is interposed in the filling pipe 11, and is connected to the control device 20 via the signal line SL15.

When the second control mode 10-2 described later (the state in which the filling control device 10 has selected the second control mode is indicated by the reference numeral 10-2) is not selected and not executed (when multiple fuel tanks to be filled do not communicate with each other in the vehicle), the filling control device 20 in the second filling system 102 performs the same function in the filling control of the second filling system 102 as the filling control device 10 in the filling control of the first filling system 101. On the other hand, when the second control mode described later (the state in which the second control mode is selected is indicated by the reference numeral 10-2) is selected (when multiple fuel tanks to be filled communicate with each other in the vehicle), as will be described later, in the filling control in the second filling system 102, the filling control device 20 is subordinate to the filling control device 10 in the first filling system 101.

In FIG. 3, in the filling control device 10 of the first filling system 101, the first control mode or the second control mode may be selected. As described above, in the figure, when the filling control device 10 selects the first mode, it is indicated by the reference numeral "10-1", and when the second control mode is selected, it is indicated by the reference numeral "10-2". The filling control device 10-1 when the first control mode is selected has a function of filling and controlling the first filling system 101 only. That is, the filling control device 10-1 that has selected the first control mode fills and controls the first filling system 101 only, like the vehicle shown in FIG. 1 when multiple fuel tanks to be filled do not communicate with each other in the vehicle (when the routes 62 and 64 in the vehicle are independent from each other). On the other hand, when the second control mode is selected, the filling control device 10-2 functions as a filling device of the second filling system 102 in addition to controlling the first filling system 101. That is, the filling control device 10-2 when the second control mode is selected has a function of being shared as a control device for the first and second filling systems 101 and 102, and filling control in both the first filling system 101 and the second filling system 102 is executed as described later when a plurality of fuel tanks to be filled communicate with each other in a vehicle as in the vehicle shown in FIG. 2 (when the routes 66 and 68 in the vehicle communicate with each other). It is possible to select whether the filling control device 10 selects and operates the first control mode (the reference numeral 10-1) or selects and operates the second control mode (the reference numeral 10-2) with a selector switch 8 (manual switch) provided on the filling control devices 10, 20 and a control panel 50. Mounting the selector switch 8 on the filling control devices 10, 20 improves convenience for an operator.

The filling control device 20 of the second filling system 102 has a function of filling and controlling the second filling system 102, but the filling control of the second filling system 102 is not executed only with the control device 20 when the second control mode is selected in the control device 10 of the first filling system 101 (the reference numeral 10-2). When the second control mode is selected in the filling control device 10 (the reference numeral 10-2), the filling control device 10-2 for which the second control mode is selected functions as the filling control device for the first filling system 101 and the second filling system 102, and the control device 20 transmits control signals to the flow rate adjusting valve 12, the shutoff valve 14 and the like of the second filling system 102 according to the control of the control device 10. That is, the filling control device 10-2 that has selected the second control mode functions as a master (master unit), and the control device 20 functions as a slave (slave unit).

In FIG. 3, the filling control device 10 on the first filling system 101 side is connected to the filling control device 20 on the second filling system 102 side via a relay device 9 (for example, PLC). In the embodiment in which the second control mode is selected in the filling control device 10 (the reference numeral 10-2), the filling control device 10-2 exchanges measurement signals and control signals with the filling members (the flow rate adjusting valve 12, the flow meter 13, etc.) on the second filling system 102 side via the signal line SL9, the relay device 9 and the filling control device 20, and performs the filling control of the second filling system 102. Here, the filling control device 10-2 in the mode in which the second control mode is selected executes the filling control of the second filling system 102 and the filling control of the first filling system 101.

The filling control of the second filling system 102 with the filling control device 10-2 in the mode in which the second control mode is selected will be further described. The filling control device 10-2 in the mode in which the second control mode is selected acquires a measurement signal from the flow meter 13 which is a filling member of the second filling system 102 via the signal line SL13, the control device 20 and the relay device 9, acquires a measurement signal from the pressure gauge 15 via the signal line SL15, the control device 20 and the relay device 9, and acquires data (pressure in the tank, temperature, filling amount, etc.) of the vehicle-side tank (not shown in FIG. 3) communicating with the second filling system 102. Then, the filling control device 10-2 in the mode in which the second control mode is selected transmits a control signal to the flow rate adjusting valve 12 of the second filling system 102 via the relay device 9, the control device 20 and the signal line SL12. When ending or stopping hydrogen filling, the filling control device 10-2 in the mode in which the second control mode is selected transmits control signals to the flow rate adjusting valve 12 and the shutoff valve 14 via the relay device 9, the control device 20 and the signal lines SL12 and SL14, and closes the flow rate adjusting valve 12 and the shutoff valve 14.

In addition, in the embodiment of FIG. 3, when executing the filling control of the first filling system 101 and the second filling system 102, the filling control device 10-2 in the mode in which the second control mode is selected has a function of adding up filling amounts in each of the first and second filling systems 101 and 102 and displaying a total filling amount on a filling member, for example, a display (not shown).

Further, in the embodiment of FIG. 3, the filling control device 10-2 in the mode in which the second control mode is selected has a function of ending filling in the filling systems 101, 102 when a higher discharge pressure reaches a filling end pressure in discharge pressures measured in each of the first and second filling systems 101, 102. Even when controlled at the highest pressure of the multiple filling systems, the lower limit of the discharge pressure is very low in the filling protocol for large vehicles such as trucks and buses, and it is extremely unlikely that the discharge pressure will fall below a lower limit of the filling protocol when filling hydrogen in an actual apparatus.

Next, control in the embodiment will be described with reference to FIG. 4. The flowchart of FIG. 4 describes a case where a vehicle having two receptacles is filled with the hydrogen filling apparatus 100 having two filling systems shown in FIG. 3 (first filling system 101, second filling system 102). In step S1 of FIG. 4, the vehicle having two receptacles is started to be filled with the hydrogen filling apparatus 100 having the first filling system 101 and the second filling system 102. In the next step S2, the two nozzles 6 and 16 (FIG. 3) of the hydrogen filling apparatus 100 are attached to the two receptacles 61 (FIGS. 1 and 2) of the vehicle to be filled, respectively, and it is determined whether or not hydrogen filling is executed simultaneously in the first filling system 101 and the second filling system 102 (whether or not filling with two nozzles). The determination is made by the hydrogen filling operator, and the selector switch 8 (FIG. 3) of the control panel 50 (FIG. 3) is operated by the determination of the operator. In step S2, when filling with two nozzles ("Yes" in step S2), the process proceeds to step S3, and when not filling with two nozzles ("No" in step S2), the process proceeds to step S4.

In step S3 (when filling with two nozzles), operating the selector switch 8 in step S2 allows the filling control devices 10 and 20 of the first filling system 101 and the second filling system 102 respectively to recognize that two-nozzle filling is performed. Then, the process proceeds to step S5. On the other hand, in step S4 (when not filling with two nozzles), since it is determined in step S2 that the two nozzles are not used, it is determined that the hydrogen filling apparatus 100 fills only with one of the filling systems. Then, a filling worker attaches any of the nozzles 6 and 16 to a receptacle (not shown) of the vehicle to be filled with hydrogen (not shown). Then, in the hydrogen filling system on the side where the nozzle is mounted on the receptacle, hydrogen filling is executed in compliance with a filling protocol. After step S4, filling control is finished.

In step S5 of FIG. 4 (step after the filling control devices 10 and 20 recognize that two nozzles filling is performed in the case of filling with two nozzles), it is determined whether or not all the fuel tanks to be filled communicate with each other in the vehicle. That is, it is determined whether all the fuel tanks filled from the two receptacles communicate in the vehicle as shown in FIG. 2, or the fuel tank filled from one receptacle and the fuel tank filled from the other receptacle do not communicate with each other independently in the vehicle as shown in FIG. 1. In the determination in step S5, information on the vehicle type of the vehicle is transmitted to the hydrogen filling apparatus 100 via the communication filling information line together with the information on the pressure and temperature in the fuel tank of the vehicle to be filled with hydrogen, and from the information on the vehicle type, it can be determined whether the fuel tank filled from one receptacle and the fuel tank filled from the other receptacle are independent of each other as shown in FIG. 1 or all the fuel tanks communicate with each other in the vehicle as shown in FIG. 2. However, it is also possible for the hydrogen filling operator to make the determination in step S5 in step S2. In step S5, if all the fuel tanks to be filled communicate with each other in the vehicle ("Yes" in step S5), the process proceeds to step S6, and if all the fuel tanks to be filled do not communicate with each other in the vehicle ("No" in step S5), the process proceeds to step S7.

In step S6 (when all the fuel tanks communicate with each other in the vehicle), the filling control device 10 of the first filling system 101 selects the second control mode (the reference numeral 10-2). Then, the filling control device 10-2 that has selected the second control mode is recognized as the master (master unit), and the filling control device 20 is recognized as the slave (slave unit). Then, the filling control device 10-2 that has selected the second control mode executes hydrogen filling control of the first filling system 101 and the second filling system 102. On the other hand, in step S7 (when all fuel tanks do not communicate with each other in the vehicle), the filling control device 10 selects the first control mode (the reference numeral 10-1), and the filling control of the first filling system 101 is executed. Then, the filling control device 20 executes the filling control of the second filling system 102. In this case, there is no master/slave relationship between the two filling control devices 10 and 20, and in the first filling system 101 and the second filling system 102, the existing hydrogen filling control is executed. Then, when the existing hydrogen filling control executed in each of the first filling system 101 and the second filling system 102 is completed (after step S7), the filling control is completed.

In FIG. 4, when all the fuel tanks communicate with each other in the vehicle, after the filling control device 10-2 for which the second control mode is selected is recognized as the master (master unit) and the filling control device 20 is recognized as the slave (slave unit), in step S8, for example, filling starts by detecting that a filling start switch (not shown) is pressed down. Then, the process proceeds to step S9. In step S9, the second control mode (the filling control device 10-2 selected) is operated in the manner described with reference to FIG. 3. That is, the filling control device 10-2 (master) that has selected the second control mode monitors behavior of the filling pressure of the first filling system 101 and the second filling system 102, and the flow control valves 2, 12, shutoff valves 4, 14, and others of the filling systems 101 and 102 are controlled so as not to deviate from the filling protocol. As described above, regarding the filling control of the second filling system 102, the filling control device 10-2 that has selected the second control mode as the master acquires measurement signals from the flow meter 13, the pressure gauge 15, and the like of the second filling system 102 through the relay device 9 (PLC) and the filling control device 20 that is the slave, and hydrogen filling can be performed according to the filling protocol to be observed.

In the filling control in step S9, the filling control device 10-2 that has selected the second control mode adds up filling amounts in each of the first and second filling systems 101, 102. Then, the total value is displayed as a hydrogen filling amount, for example, on a display (not shown). Then, in the filling control in step S9, filling pressure is measured in each of the first and second filling systems 101 and 102. In step S10 following step S9, when filling pressure on the high-pressure side in the filling pressure measured in each of the filling systems 101 and 102 reaches the filling end pressure, hydrogen filling (hydrogen filling with filling systems 101 and 102) for a large vehicle being filled with hydrogen is completed.

According to the illustrated embodiment, since the filling nozzles 6 and 16 in the plurality of (for example, two) filling systems 101 and 102 are mounted on the plurality of (for example, two) receptacles 61 of a large truck or a bus for filling, hydrogen can be filled in a much shorter time as compared with the case where either one of the filling nozzles 6 and 16 is attached to each of the receptacles 61 and filled with hydrogen.

Further, according to the illustrated embodiment, the filling control device 10 of the first filling system 101 is shown as the filling control device 10-1 when the first control mode is selected, and is shown as the filling control device 10-2 when the second control mode is selected, and the filling control device 10-1 for which the first control mode is selected has a function of controlling only the first filling system 101, and the filling control device 10-2 for which the second control mode is selected has a function of being shared as a control device for both the first and second filling systems 101 and 102. Then, when the fuel tanks 60 to be filled communicate with each other in the vehicle, sharing the filling control device 10-2 with the second control mode selected as a control device for a plurality of (for example, two) filling systems 101 and 102 allows a plurality of fuel tanks communicating in the vehicle in the first and second filling systems 101, 102 to be quickly filled.

Then, in the mode in which the second control mode is activated, since the flow rate control valve 12, the flow meter 13, the shutoff valve 14 and the like in the second filling system 102 provided with the other filling control device 20 are controlled via the relay device 9 (for example, PLC), the data on the fuel tank 60 communicating with the second filling system 102 in which the other filling control device 20 is provided is also acquired, and based on the data on the fuel tank 60 communicating with the second filling system 102 also, the filling control device 10-2 with the second control mode selected allows hydrogen filling according to the filling protocol to be observed. When the fuel tanks 60 to be filled do not communicate with each other in the vehicle, the filling control device 10-1 selecting the first control mode executes the filling control of the first filling system 101, and the filling control device 20 executes the filling control of the second filling system 102. That is, according to the illustrated embodiment, whether the plurality of fuel tanks 60 are independent of each other or communicate with each other in the vehicle, hydrogen filling can be performed quickly according to the filling protocol to be observed.

Further, according to the illustrated embodiment, when the second control mode of the filling control device 10 is activated, the filling control device 10-2 in which the second control mode is selected adds up filling amounts in each of the first and second filling systems 101 and 102, and has a function to display the total value as the hydrogen filling amount on a display (not shown), workers can grasp the actual filling amount. In addition, when the second control mode is activated, when filling pressure on the high-pressure side measured in each of the first and second filling systems 101 and 102 reaches the filling end pressure, it has a function to finish hydrogen filling of large vehicles during hydrogen filling, so that safe filling can be performed.

Next, the second embodiment of the hydrogen filling apparatus according to the present invention will be described with reference to FIG. 5.

In FIG. 5, the entire hydrogen filling apparatus is indicated by a reference numeral 110, and one filling control device 80 controls two filling systems 101 and 102. Other components are the same as those of the hydrogen filling apparatus 100 in FIG. 3.

As shown in FIG. 1, the hydrogen filling receptacles 61-1 and 61-2 are provided, the route 62 communicating the hydrogen filling receptacle 61-1 and the fuel tanks 60-1 and 60-2, and the route 64 communicating the hydrogen filling receptacle 61-2 and the fuel tanks 60-3 and 60-4 are provided, and when the route 62 and the route 64 are independent, the filling nozzle 6 shown in FIG. 5 is connected to the hydrogen filling receptacle 61-1, and the filling nozzle 16 is connected to the hydrogen filling receptacle 61-2, and the filling control device 80 individually controls the filling systems 101, 102 according to a filling protocol to be observed (the first control mode).

More specifically, the hydrogen gas stored in the rear facility 30 in FIG. 5 flows through the filling hose 7 and the filling pipe 1 via the flow rate adjusting valve 2, the shutoff valve 4, and the flow meter 3, and is supplied to the fuel tanks 60-1 and 60-2 (FIG. 1) via the filling nozzle 6. The filling control device 80 acquires measurement result of the flow meter 3 via the signal line SL3, and transmits the flow rate control signal to the flow rate adjusting valve 2 via the signal line SL2. Further, when the filling control device 80 ends or stops filling, the filling control device 80 transmits control signals to the flow rate adjusting valve 2 and the shutoff valve 4 via the signal lines SL2 and SL4 respectively, to close the flow rate adjusting valve 2 and the shutoff valve 4. Then, filling pressure in the filling pipe 1 is measured with the pressure gauge 5, and measurement result of the pressure gauge 5 is input to the filling control device 80 via the signal line SL5. The filling control device 80 sends and receives information and control signals to the flow rate adjusting valve 2, the flow meter 3, the shutoff valve 4 and the pressure gauge 5 of the first filling system 101, and after obtaining data on the vehicle side tank (pressure in the tank, temperature, filling amount, etc.), hydrogen gas is supplied to the vehicle side tank within an appropriate pressure range according to a pressure difference from the inside of the vehicle side tank, and hydrogen filling is performed according to a filling protocol to be observed.

Further, independently of the above operation, hydrogen gas stored in the rear facility 40 flows through the filling hose 17 and the filling pipe 11 via the flow rate adjusting valve 12, the shutoff valve 14, and the flow meter 13, and is supplied to the fuel tanks 60-3 and 60-4 (FIG. 1) via the filling nozzle 16. The filling control device 80 acquires measurement result of the flow meter 13 via the signal line SL13, and transmits the flow rate control signal to the flow rate adjusting valve 12 via the signal line SL12. Further, when the filling control device 80 ends or stops filling, the filling control device 80 transmits control signals to the flow rate adjusting valve 12 and the shutoff valve 14 via the signal lines SL12 and SL14 respectively, to close the flow rate adjusting valve 12 and the shutoff valve 14. Then, filling pressure in the filling pipe 11 is measured with the pressure gauge 15, and the measurement result of the pressure gauge 15 is input to the filling control device 80 via the signal line SL15. The filling control device 80 sends and receives information and control signals to the flow rate adjusting valve 12, the flow meter 13, the shutoff valve 14 and the pressure gauge 15 of the second filling system 102, and after obtaining data (pressure in the tank, temperature, filling amount, etc.) on the vehicle side tank, hydrogen gas is supplied to the vehicle side tank within an appropriate pressure range according to a pressure difference from the inside of the vehicle side tank, and hydrogen filling is performed according to a filling protocol to be observed.

On the other hand, as shown in FIG. 2, when the route 66 communicating the hydrogen filling receptacle 61-3 and the fuel tanks 60-5 and 60-6, and the route 68 communicating the hydrogen filling receptacle 61-4 and the fuel tanks 60-7 and 60-8 are communicated in the vehicle via the route 70, the filling nozzle 6 shown in FIG. 5 is connected to the hydrogen filling receptacle 61-3, and the filling nozzle 16 is connected to the hydrogen filling receptacle 61-4 and the filling control device 80 comprehensively controls the plurality of filling systems 101, 102 according to a filling protocol to be observed (the second control mode).

More specifically, when all the fuel tanks 60-5 to 60-8 shown in FIG. 2 communicate with each other in the vehicle, the filling control device 80 monitors behavior of filling pressure of the first filling system 101 and the second filling system 101; controls the flow control valves 2, 12, the shutoff valves 4, 14, and the like of the filling systems 101 and 102 so as not to deviate from a filling protocol; acquires measurement signals from the flowmeters 3, 13, the pressure gauges 5, 15 and others; finishes filling when a highest pressure measured in the filling systems 101 and 102 reaches a filling end pressure.

Switching of the first control mode or the second control mode in the filling control device 80 can be selected (switched) by the selector switch 8 (manual switch) provided on the filling control device 80 and the control panel 50. Mounting the selector switch 8 on the filling control device 80 improves convenience for an operator.

As described above, in this second embodiment also, whether the plurality of fuel tanks (60) are independent of each other or communicate with each other in a vehicle, hydrogen can be rapidly filled according to a filling protocol to be observed.

Further, in the hydrogen filling apparatus 110 also, when executing the filling controls of the first filling system 101 and the second filling system 102, the filling control device 80 has functions of adding up filling amounts of the first and second filling systems 101 and 102 and displaying total filling amount on a filling member, for example, a display (not shown).

It is added that the illustrated embodiment is merely an example and is not a description intended to limit the technical scope of the present invention.

DESCRIPTION OF THE REFERENCE NUMERALS 1,11 Filling pipes
2, 12 Flow control valves
3,13 Flowmeters
4,14 Shutoff valves
5,15 Pressure gauges
6,16 Filling nozzles
7,17 Filling hoses
8 Switching means
9 Relay device (for example, Relay Programmable Logic Controller)
10-1 Filling control device selecting first control mode
10-2 Filling control device selecting second control mode
30,40 Rear facilities
50 Control panel
80 Filling control device
100, 110 Hydrogen filling apparatus
101,102 Filling systems

The invention claimed is:
1. A hydrogen filling apparatus comprising:
a plurality of filling systems;
a plurality of filling control devices including a first filling control device and a second filling control device, each filling control device being included in a respective ones of the plurality of filling systems;
a plurality of filling pipes communicating with a respective rear facility associated with a respective one of the plurality of filling systems;
a plurality of sets of filling members interposed in respective ones of the filling pipes and operatively connected to at least one of the plurality of filling control devices;
a plurality of filling hoses connected to respective ones of the filling pipes, each filling hose having a filling nozzle at a tip; and
a relay device connecting the first filling control device to the second filling control device;
wherein the first filling control device is operatively configured to selectively implement:

a first control mode that controls only a first filling system of the plurality of filling systems;
a second control mode that facilitates shared control for the first filling system and a second filling system of the plurality of filling systems;
switching between the first control mode and the second control mode; and
adjusting of the set of filling members in the filling system equipped with the second filling control device via the relay device in the second control mode.

2. The filling apparatus as claimed in claim 1, wherein each set of filling members has a function of adding up and displaying a filling amount in each of the filling systems in the second control mode.

3. The filling apparatus as claimed in claim 1, wherein the first filling control device has a function of ending filling in the filling systems when a highest pressure measured in the filling systems reaches a filling end pressure in the second control mode.

4. A hydrogen filling apparatus comprising:
a plurality of filling systems;
a single filling control device for controlling the plurality of filling systems;
a plurality of filling pipes communicating with a respective rear facility in each of the filling systems;
a plurality of sets of filling members interposed in respective ones of the plurality of filling pipes and connected to the filling control device; and
a plurality of filling hoses connected to respective ones of the plurality of filling pipes, each filling hose having a filling nozzle at a tip;
wherein said filling control device is configured to selectively implement a first control mode that individually controls each of the filling systems and a second control mode that comprehensively controls the filling systems.

5. The filling apparatus as claimed in claim 4, wherein each set of filling members has a function of adding up and displaying a filling amount in each of the filling systems in the second control mode.

6. The filling apparatus as claimed in claim 4, wherein the filling control device is configured to end filling in the filling systems when a highest pressure measured in the filling systems reaches a filling end pressure in the second control mode.

7. The filling apparatus as claimed in claim 2, wherein the first filling control device has a function of ending filling in the filling systems when a highest pressure measured in the filling systems reaches a filling end pressure in the second control mode.

8. The filling apparatus as claimed in claim 5, wherein the filling control device has a function of ending filling in the filling systems when a highest pressure measured in the filling systems reaches a filling end pressure in the second control mode.

* * * * *